1,829,957

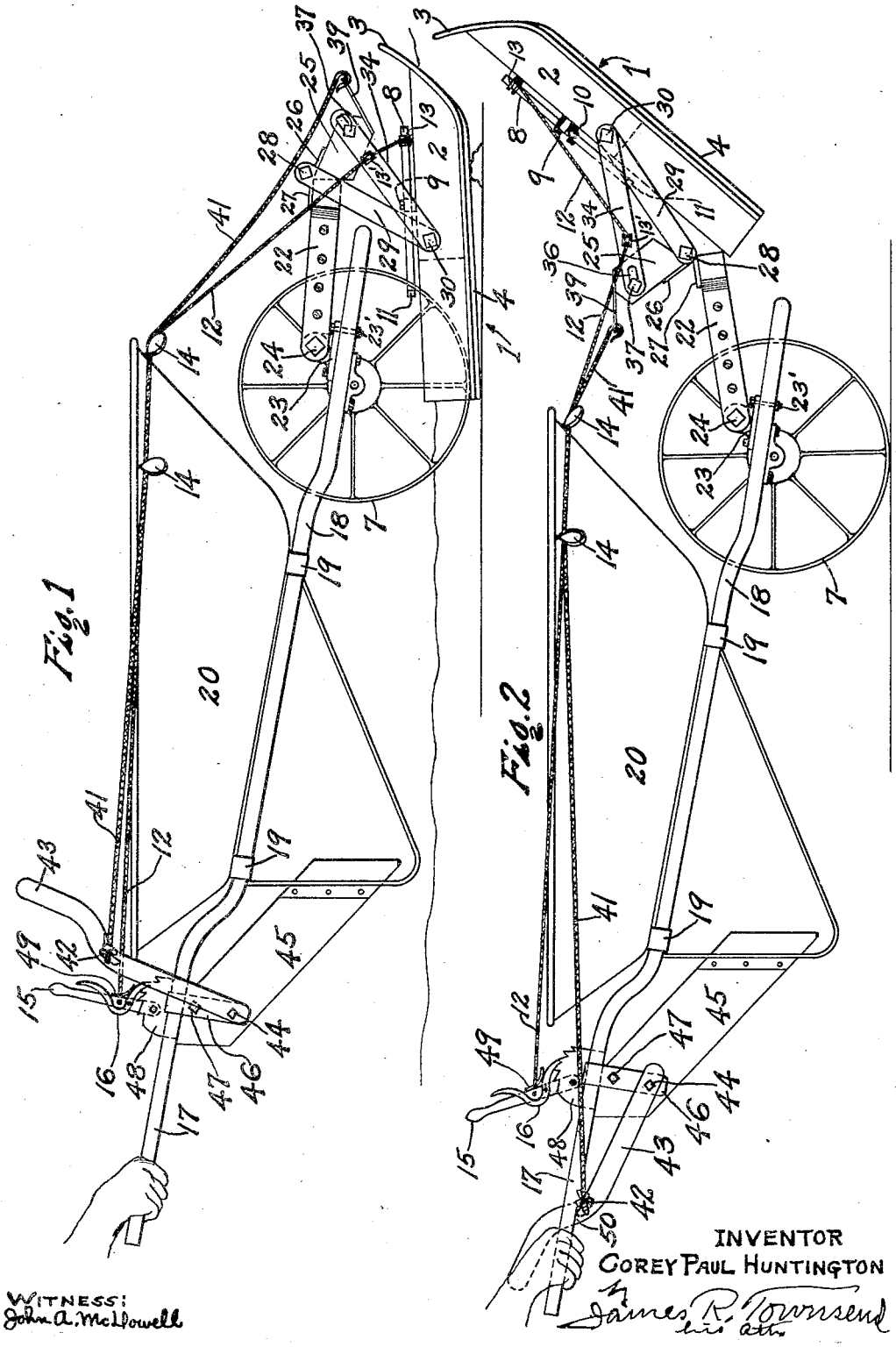

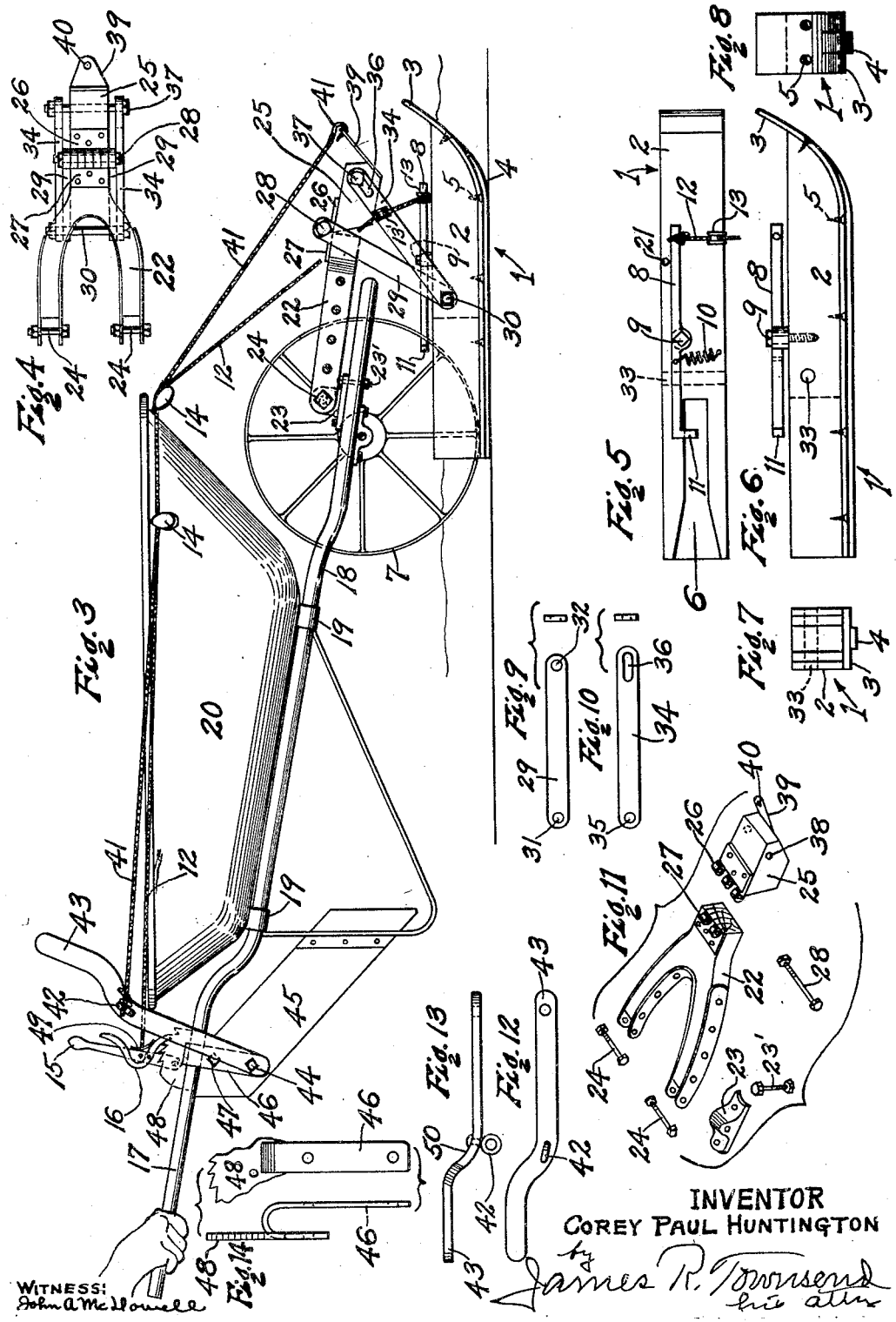
Nov. 3, 1931. C. P. HUNTINGTON 1,829,957
SLED RUNNER ADJUSTMENT FOR VEHICLE WHEELS
Filed June 25, 1929 2 Sheets-Sheet 2
INVENTOR
COREY PAUL HUNTINGTON Patented Nov. 3, 1931

UNITED STATES PATENT OFFICE

COREY PAUL HUNTINGTON, OF SAN BERNARDINO, CALIFORNIA

SLED RUNNER ADJUSTMENT FOR VEHICLE WHEELS

Application filed June 25, 1929. Serial No. 373,511.

This invention pertains to means whereby vehicles may be conveniently adapted for practical travel over bareground and snow or ice surfaces successively. The invention is applicable to use in connection with aircraft, automobiles, trailers, carts, wagons, wheel-barrows and other vehicles adapted to travel on wheels and may also be applied to toys in any desired size and with various adaptations.

The invention broadly includes the combination with a frame and a supported wheel therefor, of a sleigh or sled runner adapted to be positioned beneath the wheel for supporting the wheel, and means whereby the runner may be adjusted to receive the wheel, and the wheel caused to run onto the runner and be carried thereby for the purpose of running over an anti-friction surface such as snow and ice, or over ground too soft to support the wheel; and I provide means whereby, when the wheel is off of the runner, the runner may be adjusted by the pilot, driver, or other operator, at a distance from the wheel, to an elevated position to allow the wheel to run freely on bare surfaces.

Another object is to provide convenient means for holding the wheel on, and for releasing the wheel from, the runner.

The invention is broadly new, basic and pioneer in that it comprises the combination with a frame having a supporting wheel, of a sled runner adapted to receive and carry the wheel, and mechanical means whereby the sled runner may be swung free from the ground and held suspended in front of the wheel ready to be returned to the supporting surface and to receive the wheel.

An object is to make provision whereby the runner may freely climb up on the unbroken snow in the process of breaking a track through such snow.

An object is to make provision by which a vehicle is adapted for quick change from wheel to sled runner, and vice versa, for anti-friction travel on roads having snow covered portions and bare portions over which the vehicle must pass in alternation.

An advantage of the invention as applied to wheel-barrows is that the workman may use the same barrow with a great saving of labor in cases where he is required to wheel over bare ground surfaces onto the snow covered surfaces and so on, as may occur in the mountains or other places in the winter.

An advantage in connection with air-craft is that the pilot, while at his station, may adjust the sled runner under the wheels of his craft when he finds it necessary or desirable to land on snow covered surfaces or on a surface too soft to bear up the air-craft wheels.

It will be sufficient for the purpose of this application to show the invention as applied to a wheel-barrow, it being understood that the flexible connections between the wheel supported frame and the runner adjusting appliance may be of various types and constructions and that I do not limit myself to any particular form. In the drawings I shall show one form of the arrangement for adjusting the runner to and from wheel supporting positions.

It is understood that the invention is intended to be applied to all the wheels of a vehicle and that each wheel will be fitted with a runner and means to adjust the same; and that the adjusting means for placing each sleigh or sled runner under, and withdraw it from beneath its wheel may be operated and controlled by various forms of hand levers or other means of control without departing from the spirit of this invention.

Other objects, advantages and features of invention may appear from the accompanying drawings, the subjoined detailed description and the appended claims.

The accompanying drawings illustrate the invention.

Figure 1 is a side elevation of the invention as applied to a wheel-barrow running in the snow, and in which the wheel is represented as supported by a sled runner that is breaking its way through the snow surface and rising over an obstruction; the handles of the wheel-barrow are represented as upheld by a workman, not shown.

Fig. 2 is a view analogous to Fig. 1 with the appliance elevated and the wheel on bare ground.

Fig. 3 is a view analogous to Figs. 1 and 2, showing a normal position of the parts when the wheel-barrow is being run over a smooth soft snow covered surface.

Fig. 4 is a plan of the runner-lifting attachment detached from the frame and from the runner.

Fig. 5 is a plan view of a runner detached and provided with a latch.

Fig. 6 is a side elevation of what is shown in Fig. 5.

Fig. 7 is a rear elevation of the runner shown in Figs. 5 and 6.

Fig. 8 is a front elevation of said runner.

Fig. 9 is a side and end view of one of the radius bars, detached.

Fig. 10 is a side and end view of one of the lost motion link lifting bars detached.

Fig. 11 is a disassembled view of the jointed supporting bracket and some of the parts going with it.

Fig. 12 is a side view of the lever for the bracket folding and lifting cord shown in Figs. 1, 2 and 3.

Fig. 13 is an edge view of said lever.

Fig. 14 embraces a side view and an edge view of the lever and ratchet attachment for a handle of the wheel-barrow frame.

The runner 1 may be of any suitable form, length, width and depth, according to the service it is to perform. In the drawings it is shown as constructed of a wooden block 2 having a steel shoe 3 provided with a central longitudinal rib 4 and fastened to the block by screws 5; and said runner block is provided at its rear end with a recess 6 to seat the wheel 7 so that the rear end of the runner will support said wheel.

8 is a latch lever pivoted at 9 to the block 2 and held in locking position by suitable means as the spring 10 which holds the detent 11 in position to hook over the felly of the wheel 7 to hold said wheel from running off the back of the runner.

12 is a connection, which may be a cord connected to the latch on the opposite side of the pivot 9 from the detent 11, and the same is rove through a pulley 13 on the block and is led through other pulleys 13', 14 to operating means as the lever 15 at the operator's station. Said lever is shown provided with a pawl 16 that is shown pivoted to the handle 17 of the wheel-barrow frame 18 which is connected by any suitable or usual means as at 19 to the wheel-barrow body 20. A stop 21 is provided to prevent the latch from swinging too far across the path of the wheel.

The runner shifting and supporting means comprises a jointed arm formed by a radius arm bracket 22 pivoted to bearing means 23 on the frame 18 by a bolt 24 and a knuckle 25, hinged by a hinge, the leaves 26, 27 of which are on the upper side of the bracket and the knuckle joint, and are pivoted together by a bolt 28. 29 is a connecting rod pivoted by the bolt 30 to the runner rearwardly of the center of gravity of such runner, and pivoted by a bolt 28 to the hinge on the top of the bracket and knuckle.

The length of the connecting rod 29 is less than the distance between its pivot 30 and the rear end of the runner so that the rear end of the runner cannot be swung past the front end of the bracket arm 22.

The bearings 23 are fixed to the frame by suitable means as the bolts 23'.

The connecting rod 29 is preferably formed of flat strap metal and is provided at its ends with round pivot holes 31, 32, through which, respectively, the pivots 28 and 30 extend to pivot the connecting rod 29 to the bracket hinge at its upper side, and to the runner 2 at the rear of the center of gravity; such bolt is run through a hole 33 bored through the knuckle, from side to side as indicated by broken lines in Figs. 5 and 7 and by solid lines in Fig. 6.

34 is a lost motion link having a round hole 35 at one end and a longitudinal slot 36 at the other end; and said link is pivoted to the runner by the pivot 30 extending through said hole 35, and is pivoted with lost motion by a bolt 37 passed through the slot 36 and through a hole 38 at the rear end of the knuckle joint. Said knuckle joint is provided with a handle 39 that is shown with a hole 40 therethrough to which is fastened a connection 41 that is rove through the pulleys 14 and connected to an eye 42 projecting from the lever 43 which is pivoted by a bolt 44 to a brace 45 that is supported by a clip 46 which is secured by a bolt 47 to the bracket and is hooked over the handle 17, and is provided with a latch segment 48 that is engaged by the pawl 16 to hold the latch cord 12. The pawl 16 may be spring pressed as at 49 to hold it in contact with the ratchet segment 48 when the latch has been withdrawn and is held open to allow the wheel 7 to be withdrawn from the seat 6 therefor.

The lever 43 is shown as provided with a bend 50 adapted to be swung underneath the wheel-barrow handle 17 so that the eye 42 can rest against the handle 17 thus to bear the weight of the runner when in the supported position shown in Fig. 2.

The runner 2 is forwardly overbalanced on its pivot 31 so that when the connection 41 is taken up by operation of lever 43, and the knuckle 25 is swung over its pivot pin 28, the heel of the runner will contact the under side of the bracket 22, and the runner will stand aslant upward forwardly as shown in Fig. 2.

I claim :—

1. The combination with a wheeled frame and a runner upon which the wheel may be seated; of a bracket pivoted to the frame, a knuckle hinged to the bracket; a connecting rod pivoted to the bracket and to the runner; a lost motion link connecting the knuckle to the pivot of the runner and means connected to the knuckle to raise and lower the same to lift the link and runner.

2. The combination with a frame and a wheel to support the frame; of a runner adapted to support the wheel; a bracket pivoted to the frame and extending in front of the wheel; a runner adapted at its rear end to support the wheel; a connecting rod; a pivot which said connecting rod is pivoted to the bracket; a pivot by which said connecting rod is connected to the runner; said second pivot being located behind the center of gravity of the runner; there being a length of rod between pivots less than the space between the runner pivot and the rear end of the runner, so that when the runner is elevated out of the way of the wheel, the rear end of the runner will engage the under side of the bracket so that gravity will hold the runner aslant ready to descend by gravity to position to receive the wheel when the support is released.

In testimony whereof, I have hereunto set my hand at Los Angeles, California, this 21st day of June, 1929.

COREY PAUL HUNTINGTON.